United States Patent [19]
Ancellin

[11] 3,774,380
[45] Nov. 27, 1973

[54] REAPING AND MOWING MACHINE
[75] Inventor: Marcel Ancellin, Paris, France
[73] Assignee: Societa FFSA, Paris, France
[22] Filed: Mar. 29, 1972
[21] Appl. No.: 239,134

[30] Foreign Application Priority Data
Apr. 23, 1971 France .............................. 7114659

[52] U.S. Cl. ................................................ 56/11.9
[51] Int. Cl. ............................................. A01d 69/04
[58] Field of Search ....................... 56/6, 10.6, 13.6, 56/10.9, 11.9

[56] References Cited
UNITED STATES PATENTS
2,920,434 1/1960 Ingram ................................ 56/10.6
2,743,567 5/1956 Martin ..................................... 56/6
3,462,926 8/1969 Webster et al ..................... 56/13.6

Primary Examiner—Russel R. Kinsey
Attorney—Louis E. Marn et al.

[57] ABSTRACT

A reaping and mowing machine having at least two drums, carrying cutting blades, mounted on a horizontal beam for rotation about vertical axes. The drums are rotated by individual hydraulic motors supplied with hydraulic fluid by a single pump via a distributor connected to the fluid inlets of the motors, and the fluid outlets of the motors are connected to a return conduit to a hydraulic fluid reservoir.

5 Claims, 4 Drawing Figures

Patented Nov. 27, 1973

Patented Nov. 27, 1973

REAPING AND MOWING MACHINE

The present invention relates to a reaping or mowing machine comprising a horizontal beam on which are mounted, for rotation in accordance with a vertical axis, drums which carry cutting blades projecting at their lower portion. Each drum is driven in rotation by the shaft of an hydraulic motor on which it is secured, the said hydraulic motor being mounted on the beam with the aid of a support means and being connected to an hydraulic circuit by a feed duct and an evacuation duct.

In the known construction shown in FIG. 1, the cutting bar comprises four rotating, knife-carrying drums 4, 4a, 4b, 4c, driven by hydraulic motors 8, 8a, 8b, 8c respectively, which are fed from a double-element pump 13. The elements 13a and 13b have equal deliveries and each one of them feeds two identical hydraulic motors 8, 8a, and 8b, 8c, respectively, connected in series in the hydraulic circuit.

This arrangement ensures substantially uniform velocity in the downstream motor 8a, 8c and the upstream motor 8, 8b of each circuit, whatever the work done by each of them, but the pressure generated in each pump element 13a, 13b is equal to the sum of the pressures utilized by the two hydraulic motors 8, 8a or 8b, 8c, connected in series.

If the upstream motor 8, 8b receives 600 p.s.i. and the downstream motor 8a, 8c receives 1,200 p.s.i. the pump element 13a or 13b must, theoretically, deliver under a pressure equal to the sum, i.e. 1,800 p.s.i.

In order to obviate this disadvantage, the present invention relates to a hydraulic circuit permitting separate feed of all the motors.

According to the invention, the pump feeds the various hydraulic motors through the intermediary of a delivery divider each section of which is connected to the inlet port of a hydraulic motor, the fluid outlet ports of the hydraulic motors being connected to a conduit for return flow to a fluid feed reservoir.

The said hydraulic circuit according to the invention permits the employment of a pump of lower pressure and makes it possible to have any desired number of the hydraulic motors to be driven by means of a single supply source provided by a simple pump.

It also permits the utilisation of the delivery division at a location remote from the feed source, with a single pressure conduit connecting the pump to the delivery divider.

Further features and advantages of the invention will be more readily understood on reading the description given hereinbelow of a plurality of examples of embodiment and on referring to the accompanying drawings, in which.

Figure 1:
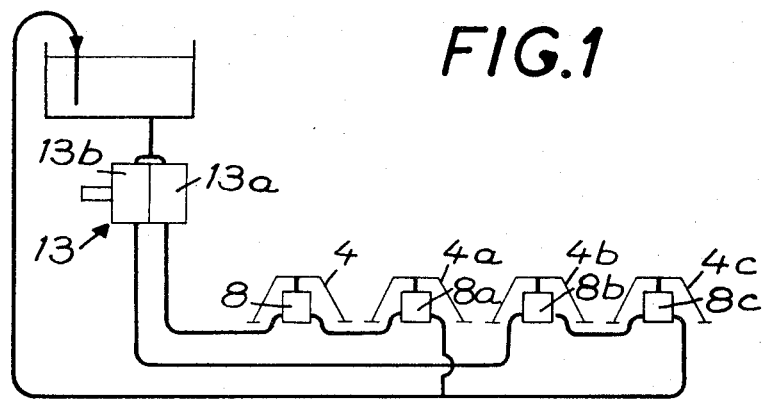
FIG. 1 is a diagram of the known hydraulic feed circuit.
Figure 2:
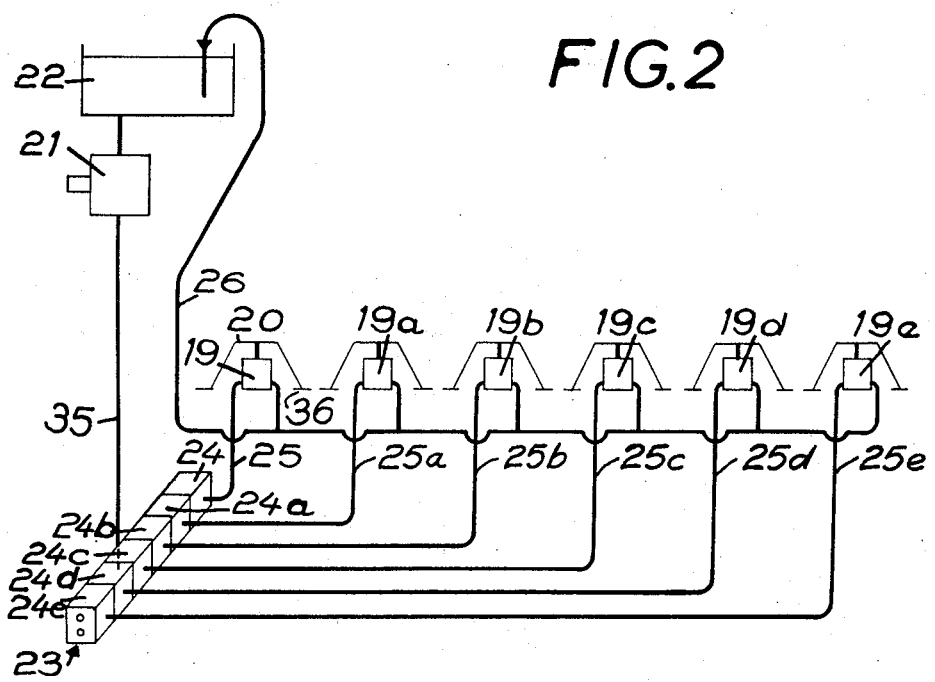
FIG. 2 is a diagram of the modified hydraulic circuit according to the present invention.

FIG. 2 shows an improved hydraulic circuit according to the invention which feeds hydraulic motors 19, 19a, 19b, 19c, 19d, 19e, driving rotating drums 20 carrying the cutting blades 36 of of a reaping or mowing machine.

The hydraulic fluid feed is effected from a reservoir 22 by means of a pump 21 connected by a conduit 35 to a delivery divider 23 comprising as many sections as there are hydraulic motors 19 to 19e. Each section 24, 24a, 24b, 24c, 24d, 24e of the delivery divider 23 is connected, respectively, to the inlet port of the hydraulic motors 19 thru 19e by corresponding conduits 25 thru 25e.

The fluid outlet ports of the hydraulic motors are connected by a return-flow conduit 26 to the feed reservoir 22.

Figure 3:
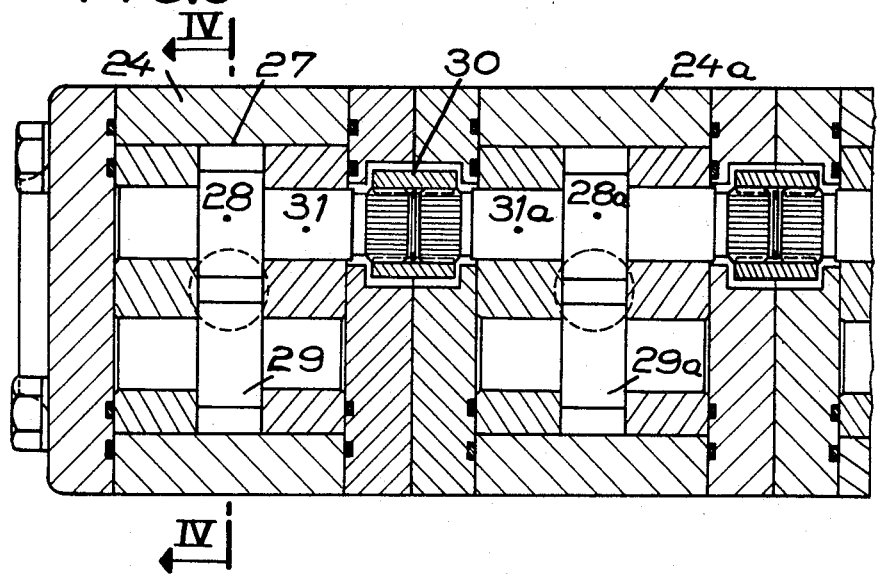
FIG. 3 is a view, in partial longitudinal section, of the delivery divider.
Figure 4:
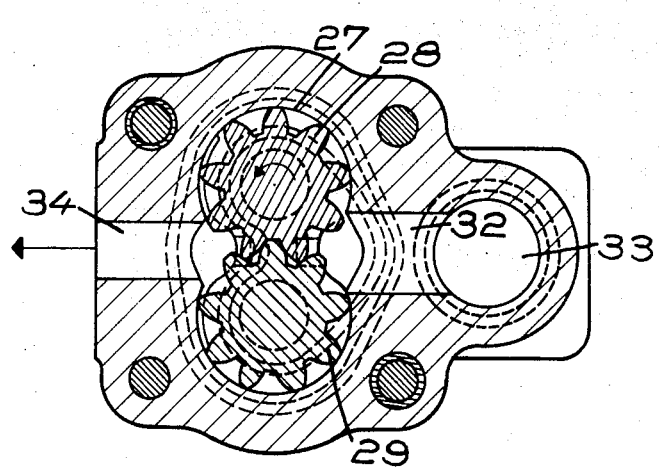
FIG. 4 is a view of the divider, in cross-section taken along the line IV—IV of FIG. 3.

The delivery divider 23, one embodiment of which is shown in FIGS. 3 and 4, is of the rotary type and comprises, for each section 24, 24a, a chamber 27 in which is disposed a pair of gears 28, 29, mounted for free rotation.

The gear 28 is connected to the gear 28a of the adjacent section by a coupling sleeve 30 secured to the ends of the shafts 31, 31a.

The inlet port 32 of the various sections 24 to 24e of the divider is connected to a single induction conduit 33 connected to the delivery conduit 35 of the pump 21.

Each section 24 to 24e comprises an independent fluid outlet orifice 34 connected to conduits 25 thru 25e for feeding the hydraulic motors.

The delivery of fluid feeding each motor is uniform and consequently the chambers 27 of the various sections 24 to 24e of the divider have the same cubic capacity. The outflow rates of the various sections are equal, independent of the variable pressure received by each of the hydraulic motors. If all the hydraulic motors 19 to 19e driving the cutter-carrying drums require, notably, a pressure of 1,200 p.s.i. the feed pump 21 will be able to deliver under this same pressure and its delivery is the sum of the deliveries utilised by the motors 19 to 19e. However, under this same pressure of 1,200 p.s.i. at the pump, a motor is able to utilise a pressure of 1,500 p.s.i., for example, if at the same instant a further motor is utilizing only 900 p.s.i. Thus, assuming that the load placed on motor 19 by rotating drum 20 is reduced and the pressure of hydraulic fluid required to operate motor 19 at normal speed is likewise reduced, say to 900 p.s.i., fluid supplied through inlet port 32 at a standard pressure will rotate gears 28 and 29 at a greater than normal speed. Shafts 31, 31a are rotated at the increased speed of gears 28 and 29 and consequently, gear 28a, for example, supplies a greater pressure to a motor 19a. Thus, a decrease in the pressure of hydraulic fluid required by one motor is compensated by fluid of increased pressure being supplied to other motors.

The relationship between pressure and delivery for the hydraulic motors 19 to 19e corresponds to the formula:

$$QP = Q1\ P1 + Q2\ P2 + Q3\ P3 + Q4\ P4 + Q5\ P5 + Q6\ P6.$$

The subject of the present invention may undergo a certain number of modifications without the scope of the invention being exceeded thereby.

I claim:

1. A reaping or mowing machine comprising a plurality of rotatable cutting drums, each of said drums being mounted about a vertical axis and provided with a plurality of cutting blades projecting from the lower portion thereof; a plurality of hydraulic motors, each of said motors adapted to drive a corresponding one of said cutting drums; pump means for supplying hydraulic fluid under pressure and characterized by: a fluid delivery divider having a common inlet connected to said pump means and a plurality of sections, each of said sections including freely rotating gear means mounted therein and having an independent fluid outlet port connected to an induction port of a corresponding one of said hydraulic motors; and shaft means for coupling said gear means of said sections.

2. A reaping or mowing machine as defined in claim 1 wherein said gear means mounted in each section of said fluid delivery divider comprises a gear pair wherein a first gear member of one of said gear pairs is coupled by said shaft means to a corresponding first gear member in an adjacent section of said fluid delivery divider.

3. Reaping or mowing machine, according to claim 1, characterised in that the various sections of the delivery divider have the same cubic capacity.

4. Reaping or mowing machine, according to claim 1, characterised in that the single element hydraulic pump forms a part of the reaping or mowing machine and is actuated by a power take-off.

5. Reaping or mowing machine according to claim 1, characterised in that the single-element hydraulic pump forms a part of the driving cell and is driven directly by the latter.

* * * * *